United States Patent
Chui et al.

(10) Patent No.: US 11,676,332 B2
(45) Date of Patent: Jun. 13, 2023

(54) ARBITRARY VIEW GENERATION

(71) Applicant: Outward, Inc., San Jose, CA (US)

(72) Inventors: Clarence Chui, Los Altos Hills, CA (US); Manu Parmar, Sunnyvale, CA (US)

(73) Assignee: Outward, Inc., San Jose, CA (US)

(*) Notice: Subject to any disclaimer, the term of this patent is extended or adjusted under 35 U.S.C. 154(b) by 360 days.

(21) Appl. No.: 17/039,837

(22) Filed: Sep. 30, 2020

(65) Prior Publication Data
US 2021/0019934 A1    Jan. 21, 2021

Related U.S. Application Data

(63) Continuation of application No. 16/186,381, filed on Nov. 9, 2018, now Pat. No. 10,832,468, which is a
(Continued)

(51) Int. Cl.
*G06K 9/36* (2006.01)
*G06T 15/20* (2011.01)
(Continued)

(52) U.S. Cl.
CPC .............. *G06T 15/205* (2013.01); *G06T 5/50* (2013.01); *G06T 7/32* (2017.01)

(58) Field of Classification Search
CPC ... G06T 15/205; G06T 7/0051; G06T 7/0065; G06T 7/0077; G06T 7/0075; G06T 5/005; G06T 2207/10028; G06T 2207/10024; G06T 3/4038; G06T 11/60; H04N 1/3876; H04N 5/23238; G06K 2009/2045
See application file for complete search history.

(56) References Cited

U.S. PATENT DOCUMENTS

| 6,222,947 B1 | 4/2001 | Koba |
| 6,377,257 B1 | 4/2002 | Borrel |
| (Continued) | | |

FOREIGN PATENT DOCUMENTS

| CN | 101281640 | 6/2012 |
| CN | 203870604 | 10/2014 |
| (Continued) | | |

OTHER PUBLICATIONS

Daniel Scharstein. "A Survey of Image-Based Rendering and Stereo". In: "View Synthesis Using Stereo Vision", Lecture Notes in Computer Science, vol. 1583, Jan. 1, 1999, pp. 23-39.
(Continued)

*Primary Examiner* — Duy M Dang
(74) *Attorney, Agent, or Firm* — Van Pelt, Yi & James LLP

(57) ABSTRACT

Techniques for generating an ensemble image are disclosed. In some embodiments, images associated with a plurality of independent scenes are translated to a prescribed origin, translated images associated with each independent scene are transformed into a prescribed perspective; and pixels of an image array having the prescribed perspective that is associated with each independent scene is populated with corresponding pixels from the transformed translated images associated with that independent scene. An ensemble image comprising the prescribed perspective is at least in part generated by combining at least some pixels of image arrays associated with the plurality of independent scenes.

54 Claims, 7 Drawing Sheets

Related U.S. Application Data continuation of application No. 15/721,431, filed on Sep. 29, 2017, now Pat. No. 10,163,251, which is a continuation-in-part of application No. 15/081,553, filed on Mar. 25, 2016, now Pat. No. 9,996,914.

(60) Provisional application No. 62/541,607, filed on Aug. 4, 2017.

(51) Int. Cl.
   *G06T 7/32* (2017.01)
   *G06T 5/50* (2006.01)

(56) References Cited

U.S. PATENT DOCUMENTS

| | | | |
|---|---|---|---|
| 8,655,052 | B2 | 2/2014 | Spooner |
| 2005/0018045 | A1 | 1/2005 | Thomas |
| 2006/0280368 | A1 | 12/2006 | Petrich |
| 2008/0143715 | A1 | 6/2008 | Moden |
| 2009/0028403 | A1 | 1/2009 | Bar-Aviv |
| 2011/0001826 | A1 | 1/2011 | Hongo |
| 2012/0120240 | A1 | 5/2012 | Muramatsu |
| 2012/0140027 | A1 | 6/2012 | Curtis |
| 2012/0163672 | A1 | 6/2012 | McKinnon |
| 2012/0314937 | A1 | 12/2012 | Kim |
| 2013/0100290 | A1 | 4/2013 | Sato |
| 2013/0259448 | A1 | 10/2013 | Stankiewicz |
| 2014/0198182 | A1 | 7/2014 | Ward |
| 2014/0254908 | A1 | 9/2014 | Strommer |
| 2014/0267343 | A1 | 9/2014 | Arcas |
| 2015/0169982 | A1 | 6/2015 | Perry |
| 2017/0103512 | A1 | 4/2017 | Mailhe |
| 2017/0278251 | A1 | 9/2017 | Peeper |
| 2017/0304732 | A1 | 10/2017 | Velic |
| 2017/0334066 | A1 | 11/2017 | Levine |
| 2017/0372193 | A1 | 12/2017 | Mailhe |
| 2018/0012330 | A1 | 1/2018 | Holzer |
| 2019/0325621 | A1 | 10/2019 | Wang |

FOREIGN PATENT DOCUMENTS

| | | |
|---|---|---|
| JP | 2000137815 | 5/2000 |
| JP | 2003187261 | 7/2003 |
| JP | 2009211335 | 9/2009 |
| JP | 2010140097 | 6/2010 |
| KR | 20060029140 | 4/2006 |
| KR | 20120137295 | 12/2012 |
| KR | 20140021766 | 2/2014 |

OTHER PUBLICATIONS

Inamoto et al. "Virtual Viewpoint Replay for a Soccer Match by View Interpolation from Multiple Cameras". IEEE Transactions on Multimedia, vol. 9 No. 6, Oct. 1, 2007, pp. 1155-1166.

Sun et al. "An overview of free viewpoint Depth-Image-Based Rendering (DIBR)." Proceedings of the Second APSIPA Annual Summit and Conference. Dec. 14, 2010, pp. 1-8.

ARBITRARY VIEW GENERATION

CROSS REFERENCE TO OTHER APPLICATIONS

This application is a continuation of U.S. patent application Ser. No. 16/186,381, now U.S. Pat. No. 10,832,468, entitled ARBITRARY VIEW GENERATION filed Nov. 9, 2018, which is a continuation of U.S. patent application Ser. No. 15/721,431, now U.S. Pat. No. 10,163,251, entitled ARBITRARY VIEW GENERATION filed Sep. 29, 2017, which is a continuation-in-part of U.S. patent application Ser. No. 15/081,553, now U.S. Pat. No. 9,996,914, entitled ARBITRARY VIEW GENERATION filed Mar. 25, 2016, all of which are incorporated herein by reference for all purposes.

U.S. patent application Ser. No. 15/721,431, now U.S. Pat. No. 10,163,251, claims priority to U.S. Provisional Patent Application No. 62/541,607 entitled FAST RENDERING OF ASSEMBLED SCENES filed Aug. 4, 2017, which is incorporated herein by reference for all purposes.

BACKGROUND OF THE INVENTION

Existing rendering techniques face a trade-off between competing objectives of quality and speed. A high quality rendering requires significant processing resources and time. However, slow rendering techniques are not acceptable in many applications, such as interactive, real-time applications. Lower quality but faster rendering techniques are typically favored for such applications. For example, rasterization is commonly employed by real-time graphics applications for relatively fast renderings but at the expense of quality. Thus, improved techniques that do not significantly compromise either quality or speed are needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Techniques for generating an arbitrary view of a scene are disclosed. The paradigm described herein entails very low processing or computational overhead while still providing a high definition output, effectively eliminating the challenging trade-off between rendering speed and quality. The disclosed techniques are especially useful for very quickly generating a high quality output with respect to interactive, real time graphics applications. Such applications rely on substantially immediately presenting a preferably high quality output in response to and in accordance with user manipulations of a presented interactive view or scene.

Figure 1:
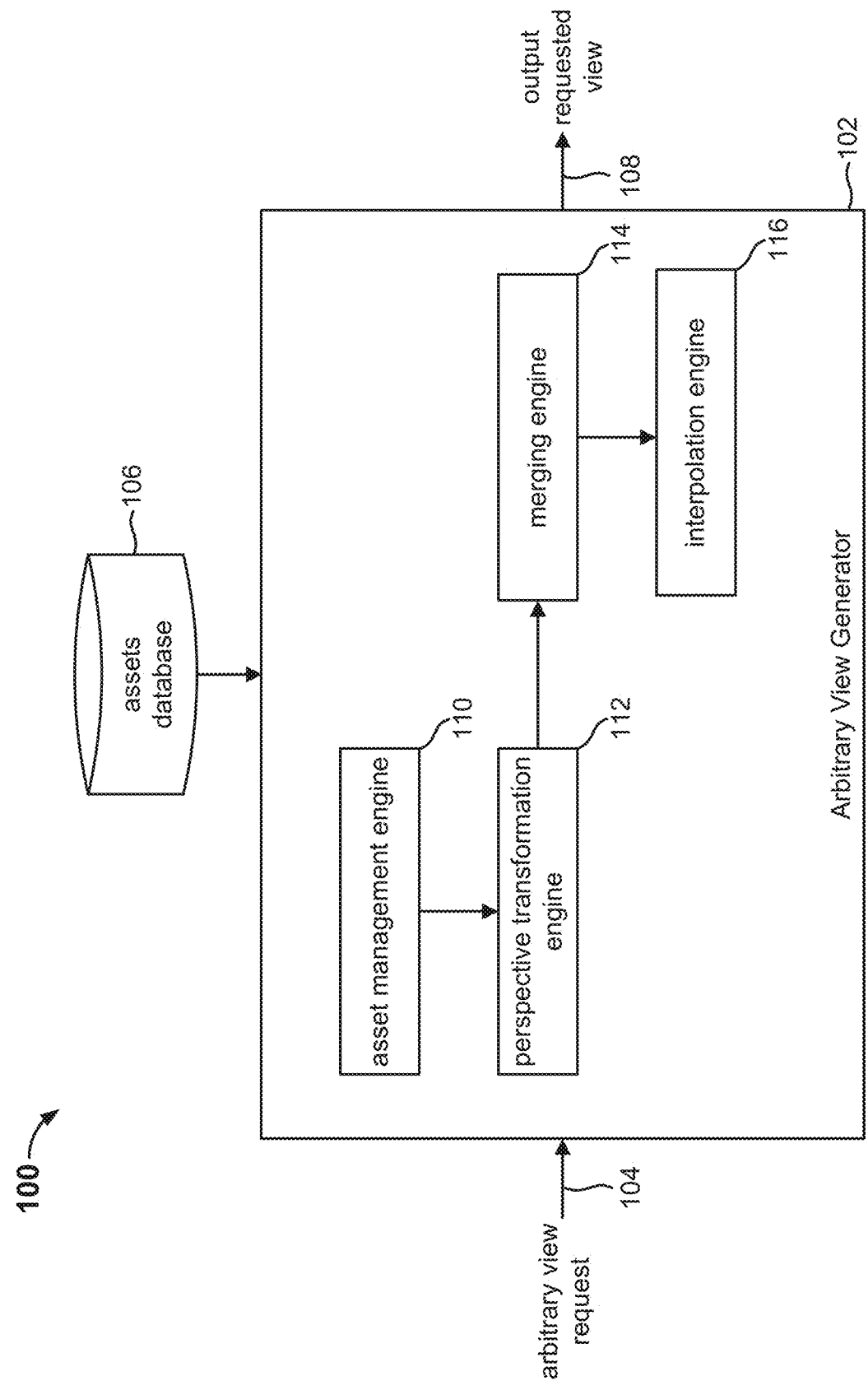
FIG. 1 is a high level block diagram illustrating an embodiment of a system for generating an arbitrary view of a scene.

FIG. 1 is a high level block diagram illustrating an embodiment of a system 100 for generating an arbitrary view of a scene. As depicted, arbitrary view generator 102 receives a request for an arbitrary view as input 104, generates the requested view based on existing database assets 106, and provides the generated view as output 108 in response to the input request. In various embodiments, arbitrary view generator 102 may comprise a processor such as a central processing unit (CPU) or a graphical processing unit (GPU). The depicted configuration of system 100 in FIG. 1 is provided for the purposes of explanation. Generally, system 100 may comprise any other appropriate number and/or configuration of interconnected components that provide the described functionality. For example, in other embodiments, arbitrary view generator 102 may comprise a different configuration of internal components 110-116, arbitrary view generator 102 may comprise a plurality of parallel physical and/or virtual processors, database 106 may comprise a plurality of networked databases or a cloud of assets, etc.

Arbitrary view request 104 comprises a request for an arbitrary perspective of a scene. In some embodiments, the requested perspective of the scene does not already exist in an assets database 106 that includes other perspectives or viewpoints of the scene. In various embodiments, arbitrary view request 104 may be received from a process or a user. For example, input 104 may be received from a user interface in response to user manipulation of a presented scene or portion thereof, such as user manipulation of the camera viewpoint of a presented scene. As another example, arbitrary view request 104 may be received in response to a specification of a path of movement or travel within a virtual environment, such as a fly-through of a scene. In some embodiments, possible arbitrary views of a scene that may be requested are at least in part constrained. For example, a user may not be able to manipulate the camera viewpoint of a presented interactive scene to any random position but rather is constrained to certain positions or perspectives of the scene.

Database 106 stores a plurality of views of each stored asset. In the given context, an asset refers to a specific scene whose specification is stored in database 106 as a plurality of views. In various embodiments, a scene may comprise a single object, a plurality of objects, or a rich virtual environment. Specifically, database 106 stores a plurality of images corresponding to different perspectives or viewpoints of each asset. The images stored in database 106 comprise high quality photographs or photorealistic renderings. Such high definition, high resolution images that populate database 106 may be captured or rendered during offline processes or obtained from external sources. In some embodiments, corresponding camera characteristics are stored with each image stored in database 106. That is, camera attributes such as relative location or position, orientation, rotation, depth information, focal length, aperture, zoom level, etc., are stored with each image. Furthermore, camera lighting information such as shutter speed and exposure may also be stored with each image stored in database 106.

Figure 2:
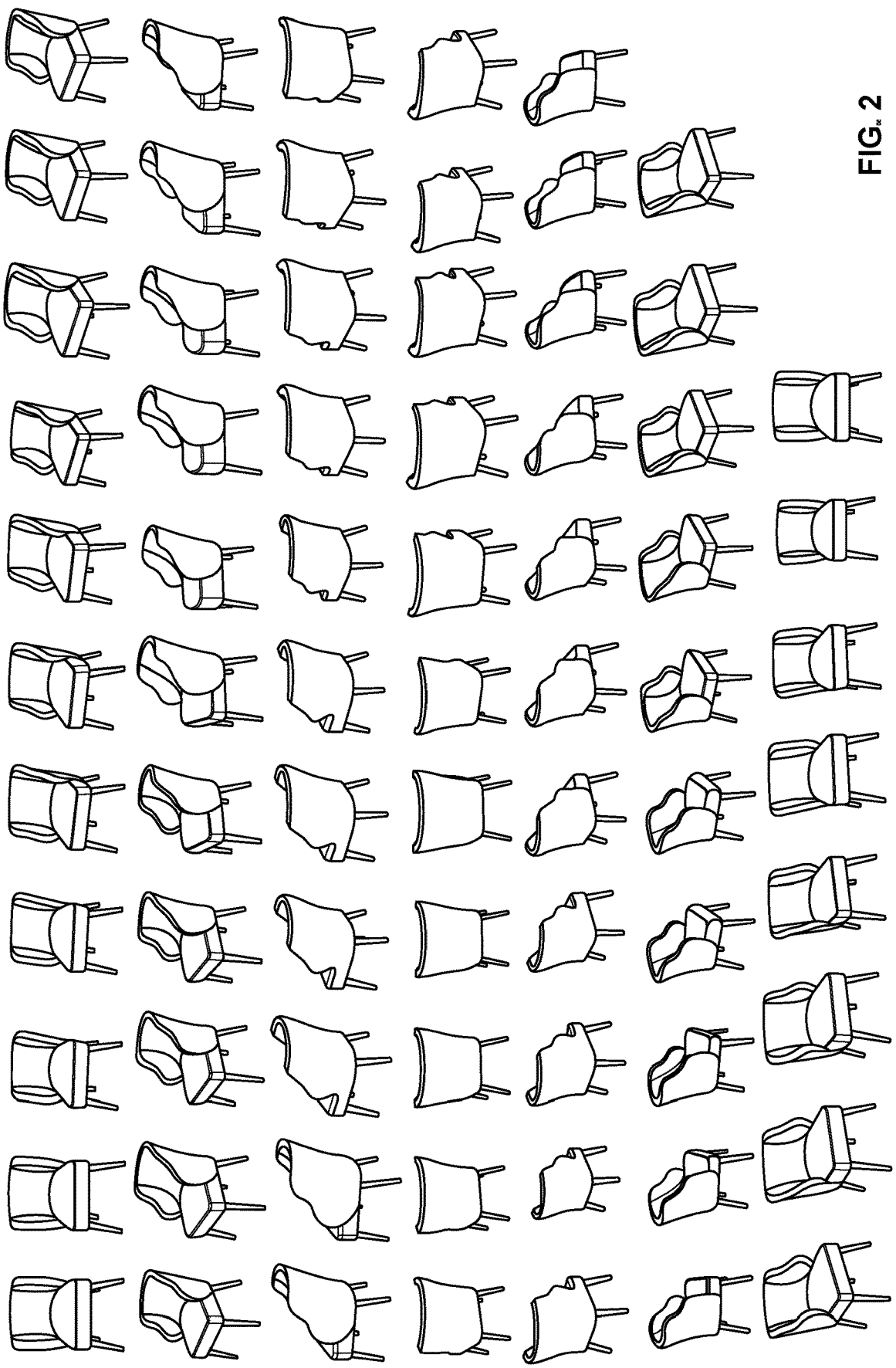
FIG. 2 illustrates an example of a database asset.

In various embodiments, any number of different perspectives of an asset may be stored in database 106. FIG. 2 illustrates an example of a database asset. In the given example, seventy-three views corresponding to different angles around a chair object are captured or rendered and stored in database 106. The views may be captured, for example, by rotating a camera around the chair or rotating the chair in front of a camera. Relative object and camera location and orientation information is stored with each generated image. FIG. 2 specifically illustrates views of a scene comprising a single object. Database 106 may also store a specification of a scene comprising a plurality of objects or a rich virtual environment. In such cases, multiple views corresponding to different locations or positions in a scene or three-dimensional space are captured or rendered and stored along with corresponding camera information in database 106. Generally, images stored in database 106 may comprise two or three dimensions and may comprise stills or frames of an animation or video sequence.

In response to a request for an arbitrary view of a scene 104 that does not already exist in database 106, arbitrary view generator 102 generates the requested arbitrary view from a plurality of other existing views of the scene stored in database 106. In the example configuration of FIG. 1, asset management engine 110 of arbitrary view generator 102 manages database 106. For example, asset management engine 110 may facilitate storage and retrieval of data in database 106. In response to a request for an arbitrary view of a scene 104, asset management engine 110 identifies and obtains a plurality of other existing views of the scene from database 106. In some embodiments, asset management engine 110 retrieves all existing views of the scene from database 106. Alternatively, asset management engine 110 may select and retrieve a subset of the existing views, e.g., that are closest to the requested arbitrary view. In such cases, asset management engine 110 is configured to intelligently select a subset of existing views from which pixels may be harvested to generate the requested arbitrary view. In various embodiments, multiple existing views may be retrieved by asset management engine 110 together or as and when they are needed by other components of arbitrary view generator 102.

The perspective of each existing view retrieved by asset management engine 110 is transformed into the perspective of the requested arbitrary view by perspective transformation engine 112 of arbitrary view generator 102. As previously described, precise camera information is known and stored with each image stored in database 106. Thus, a perspective change from an existing view to the requested arbitrary view comprises a simple geometric mapping or transformation. In various embodiments, perspective transformation engine 112 may employ any one or more appropriate mathematical techniques to transform the perspective of an existing view into the perspective of an arbitrary view. In the cases in which the requested view comprises an arbitrary view that is not identical to any existing view, the transformation of an existing view into the perspective of the arbitrary view will comprise at least some unmapped or missing pixels, i.e., at angles or positions introduced in the arbitrary view that are not present in the existing view.

Pixel information from a single perspective-transformed existing view will not be able to populate all pixels of a different view. However, in many cases, most, if not all, pixels comprising a requested arbitrary view may be harvested from a plurality of perspective-transformed existing views. Merging engine 114 of arbitrary view generator 102 combines pixels from a plurality of perspective-transformed existing views to generate the requested arbitrary view. Ideally, all pixels comprising the arbitrary view are harvested from existing views. This may be possible, for example, if a sufficiently diverse set of existing views or perspectives of the asset under consideration is available and/or if the requested perspective is not too dissimilar from the existing perspectives.

Any appropriate techniques may be employed to combine or merge pixels from a plurality of perspective-transformed existing views to generate the requested arbitrary view. In one embodiment, a first existing view that is closest to the requested arbitrary view is selected and retrieved from database 106 and transformed into the perspective of the requested arbitrary view. Pixels are then harvested from this perspective-transformed first existing view and used to populate corresponding pixels in the requested arbitrary view. In order to populate pixels of the requested arbitrary view that were not available from the first existing view, a second existing view that includes at least some of these remaining pixels is selected and retrieved from database 106 and transformed into the perspective of the requested arbitrary view. Pixels that were not available from the first existing view are then harvested from this perspective-transformed second existing view and used to populate corresponding pixels in the requested arbitrary view. This process may be repeated for any number of additional existing views until all pixels of the requested arbitrary view have been populated and/or until all existing views have been exhausted or a prescribed threshold number of existing views have already been used.

In some embodiments, a requested arbitrary view may include some pixels that are not available from any existing views. In such cases, interpolation engine 116 is configured to populate any remaining pixels of the requested arbitrary view. In various embodiments, any one or more appropriate interpolation techniques may be employed by interpolation engine 116 to generate these unpopulated pixels in the requested arbitrary view. Examples of interpolation techniques that may be employed include, for instance, linear interpolation, nearest neighbor interpolation, etc. Interpolation of pixels introduces averaging or smoothing. Overall image quality may not be significantly affected by some interpolation, but excessive interpolation may introduce unacceptable blurriness. Thus, interpolation may be desired to be sparingly used. As previously described, interpolation is completely avoided if all pixels of the requested arbitrary view can be obtained from existing views. However, interpolation is introduced if the requested arbitrary view includes some pixels that are not available from any existing views. Generally, the amount of interpolation needed depends on the number of existing views available, the diversity of perspectives of the existing views, and/or how different the perspective of the arbitrary view is in relation to the perspectives of the existing views.

With respect to the example depicted in FIG. 2, seventy-three views around a chair object are stored as existing views of the chair. An arbitrary view around the chair object that is different or unique from any of the stored views may be generated using a plurality of these existing views, with preferably minimal, if any, interpolation. However, generating and storing such an exhaustive set of existing views may not be efficient or desirable. In some cases, a significantly smaller number of existing views covering a sufficiently diverse set of perspectives may instead be generated and stored. For example, the seventy-three views of the chair object may be decimated into a small set of a handful of views around the chair object.

As previously mentioned, in some embodiments, possible arbitrary views that may be requested may at least in part be constrained. For example, a user may be restricted from moving a virtual camera associated with an interactive scene to certain positions. With respect to the given example of FIG. 2, possible arbitrary views that may be requested may be limited to arbitrary positions around the chair object but may not, for example, include arbitrary positions under the chair object since insufficient pixel data exists for the bottom of the chair object. Such constraints on allowed arbitrary views ensure that a requested arbitrary view can be generated from existing data by arbitrary view generator 102.

Arbitrary view generator 102 generates and outputs the requested arbitrary view 108 in response to input arbitrary view request 104. The resolution or quality of the generated arbitrary view 108 is the same as or similar to the qualities of the existing views used to generate it since pixels from those views are used to generate the arbitrary view. Thus, using high definition existing views in most cases results in a high definition output. In some embodiments, the generated arbitrary view 108 is stored in database 106 with other existing views of the associated scene and may subsequently be employed to generate other arbitrary views of the scene in response to future requests for arbitrary views. In the cases in which input 104 comprises a request for an existing view in database 106, the requested view does not need to be generated from other views as described; instead, the requested view is retrieved via a simple database lookup and directly presented as output 108.

Arbitrary view generator 102 may furthermore be configured to generate an arbitrary ensemble view using the described techniques. That is, input 104 may comprise a request to combine a plurality of objects into a single custom view. In such cases, the aforementioned techniques are performed for each of the plurality of objects and combined to generate a single consolidated or ensemble view comprising the plurality of objects. Specifically, existing views of each of the plurality of objects are selected and retrieved from database 106 by asset management engine 110, the existing views are transformed into the perspective of the requested view by perspective transformation engine 112, pixels from the perspective-transformed existing views are used to populate corresponding pixels of the requested ensemble view by merging engine 114, and any remaining unpopulated pixels in the ensemble view are interpolated by interpolation engine 116. In some embodiments, the requested ensemble view may comprise a perspective that already exists for one or more objects comprising the ensemble. In such cases, the existing view of an object asset corresponding to the requested perspective is employed to directly populate pixels corresponding to the object in the ensemble view instead of first generating the requested perspective from other existing views of the object.

As an example of an arbitrary ensemble view comprising a plurality of objects, consider the chair object of FIG. 2 and an independently photographed or rendered table object. The chair object and the table object may be combined using the disclosed techniques to generate a single ensemble view of both objects. Thus, using the disclosed techniques, independently captured or rendered images or views of each of a plurality of objects can be consistently combined to generate a scene comprising the plurality of objects and having a desired perspective. As previously described, depth information of each existing view is known. The perspective transformation of each existing view includes a depth transformation, allowing the plurality of objects to be appropriately positioned relative to one another in the ensemble view.

Generating an arbitrary ensemble view is not limited to combining a plurality of single objects into a custom view. Rather, a plurality of scenes having multiple objects or a plurality of rich virtual environments may be similarly combined into a custom ensemble view. For example, a plurality of separately and independently generated virtual environments, possibly from different content generation sources and possibly having different existing individual perspectives, may be combined into an ensemble view having a desired perspective. Thus, generally, arbitrary view generator 102 may be configured to consistently combine or reconcile a plurality of independent assets comprising possibly different existing views into an ensemble view having a desired, possibly arbitrary perspective. A perfectly harmonious resulting ensemble view is generated since all combined assets are normalized to the same perspective. The possible arbitrary perspectives of the ensemble view may be constrained based on the existing views of the individual assets available to generate the ensemble view.

Figure 3:
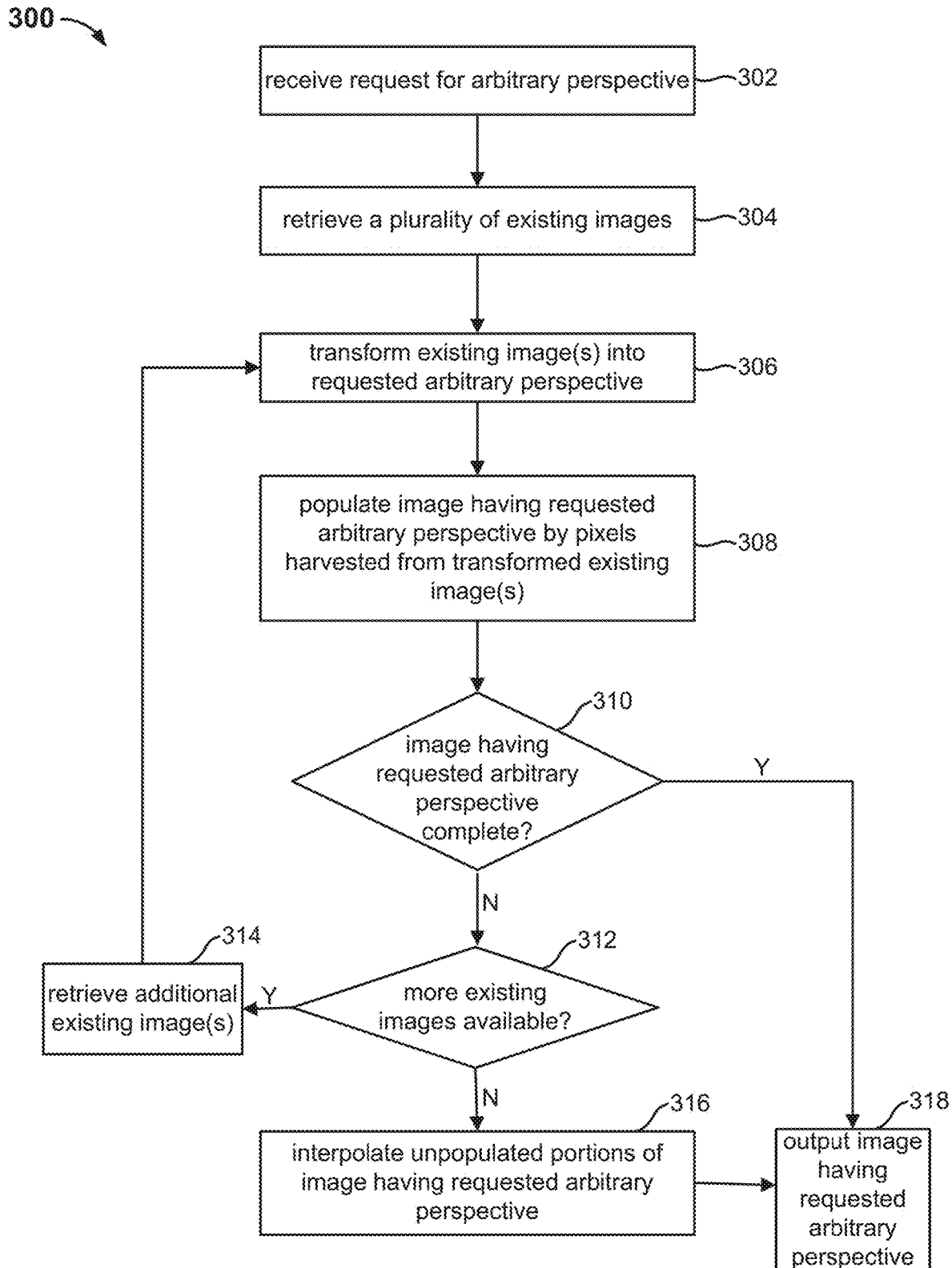
FIG. 3 is a flow chart illustrating an embodiment of a process for generating an arbitrary perspective.

FIG. 3 is a flow chart illustrating an embodiment of a process for generating an arbitrary perspective. Process 300 may be employed, for example, by arbitrary view generator 102 of FIG. 1. In various embodiments, process 300 may be employed to generate an arbitrary view of a prescribed asset or an arbitrary ensemble view.

Process 300 starts at step 302 at which a request for an arbitrary perspective is received. In some embodiments, the request received at step 302 may comprise a request for an arbitrary perspective of a prescribed scene that is different from any existing available perspectives of the scene. In such cases, for example, the arbitrary perspective request may be received in response to a requested change in perspective of a presented view of the scene. Such a change in perspective may be facilitated by changing or manipulating a virtual camera associated with the scene, such as by panning the camera, changing the focal length, changing the zoom level, etc. Alternatively, in some embodiments, the request received at step 302 may comprise a request for an arbitrary ensemble view. As one example, such an arbitrary ensemble view request may be received with respect to an application that allows a plurality of independent objects to be selected and provides a consolidated, perspective-corrected ensemble view of the selected objects.

At step 304, a plurality of existing images from which to generate at least a portion of the requested arbitrary perspective is retrieved from one or more associated assets databases. The plurality of retrieved images may be associated with a prescribed asset in the cases in which the request received at step 302 comprises a request for an arbitrary perspective of a prescribed asset or may be associated with a plurality of assets in the cases in which the request received at step 302 comprises a request for an arbitrary ensemble view.

At step 306, each of the plurality of existing images retrieved at step 304 that has a different perspective is transformed into the arbitrary perspective requested at step 302. Each of the existing images retrieved at step 304 includes associated perspective information. The perspective of each image is defined by the camera characteristics associated with generating that image such as relative position, orientation, rotation, angle, depth, focal length, aperture, zoom level, lighting information, etc. Since complete camera information is known for each image, the perspective transformation of step 306 comprises a simple mathematical operation. In some embodiments, step 306 also optionally includes a lighting transformation so that all images are consistently normalized to the same desired lighting conditions.

At step 308, at least a portion of an image having the arbitrary perspective requested at step 302 is populated by pixels harvested from the perspective-transformed existing images. That is, pixels from a plurality of perspective-corrected existing images are employed to generate an image having the requested arbitrary perspective.

At step 310, it is determined whether the generated image having the requested arbitrary perspective is complete. If it is determined at step 310 that the generated image having the requested arbitrary perspective is not complete, it is determined at step 312 whether any more existing images are available from which any remaining unpopulated pixels of the generated image may be mined. If it is determined at step 312 that more existing images are available, one or more additional existing images are retrieved at step 314, and process 300 continues at step 306.

If it is determined at step 310 that the generated image having the requested arbitrary perspective is not complete and if it is determined at step 312 that no more existing images are available, any remaining unpopulated pixels of the generated image are interpolated at step 316. Any one or more appropriate interpolation techniques may be employed at step 316.

If it is determined at step 310 that the generated image having the requested arbitrary perspective is complete or after interpolating any remaining unpopulated pixels at step 316, the generated image having the requested arbitrary perspective is output at step 318. Process 300 subsequently ends.

As described, the disclosed techniques may be used to generate an arbitrary perspective based on other existing perspectives. Normalizing different existing perspectives into a common, desired perspective is possible since camera information is preserved with each existing perspective. A resulting image having the desired perspective can be constructed from mining pixels from perspective-transformed existing images. The processing associated with generating an arbitrary perspective using the disclosed techniques is not only fast and nearly instantaneous but also results in a high quality output, making the disclosed techniques particularly powerful for interactive, real-time graphics applications.

The aforementioned techniques comprise a uniquely efficient paradigm for generating a desired arbitrary view or perspective of a scene or asset using existing reference views or images having perspectives that are different from the desired perspective. More specifically, the disclosed techniques facilitate the quick generation of a high definition image having a desired arbitrary perspective from one or more existing reference images from which most, if not all, pixels of the desired arbitrary perspective are harvested. As described, the existing reference images comprise high quality photographs or photorealistic renderings and may be captured or rendered during offline processes or obtained from external sources.

In some embodiments, the reference images or views of an asset comprise one or more orthographic views of the asset. Such orthographic views of a plurality of different assets may be combined (e.g., stacked together or placed side-by-side like building blocks) to generate an orthographic view of a composite or ensemble asset built from or by combining a plurality of independently captured or rendered individual assets that can then be collectively transformed into any arbitrary camera perspective by transforming the orthographic views of each of the individual assets into the desired arbitrary perspective.

As described, each reference view or image of an asset in database 106 is stored with corresponding metadata that may be employed to facilitate perspective transformations of the image. The metadata may include parameters such as camera attributes, relative location or position, depth information, lighting information, surface normal vectors, etc. In addition to pixel intensity values (e.g., RGB values), each reference view or image of an asset comprises various metadata parameters associated with each pixel comprising the image. In some embodiments, one or more of the red, green, and blue (RGB) channels or values of a pixel may be employed to encode pixel metadata. In various embodiments, metadata may be generated from a three-dimensional polygon mesh model when rendering an image or view from the model, when imaging or scanning an asset using an imaging device such as a camera or a scanning device such as 3D scanner, or a combination of both. In some cases, certain metadata values, e.g., depth and/or surface normal data, may be estimated from position or location data.

The metadata of a pixel, for example, may include information about the relative location or position (e.g., x, y, and z coordinate values) of the point in three-dimensional space that projects at that pixel. In such cases, any appropriate origin may be defined for the coordinate system. For example, the origin may be defined as the center (e.g., center of mass) of an object if a scene comprises a single object or of a plurality of objects if a scene comprises multiple objects.

The metadata of a pixel may furthermore include information about surface normal vectors (e.g., angles made with the x, y, and z axes) at the position of the pixel. Such surface normal vectors facilitate modifying or varying the lighting of a generated view or scene. More specifically, re-lighting a scene comprises scaling pixel values based on how well the surface normal vectors of the pixel match the direction of a newly added, removed, or otherwise altered light source, which may at least in part be quantified, for example, by the dot product of the light direction and normal vectors of the pixel.

The metadata of a pixel may moreover include texture mapping coordinates (e.g., u and v coordinate values). In such cases, an actual pixel value at a point is determined by reading the RGB values at the corresponding coordinates in a texture image. Specifying pixel values via texture mapping coordinates facilitates modifying or varying the texture of a generated view or scene or part thereof. More specifically, the texture can be changed or modified by simply swapping or replacing a referenced texture image with another texture image having the same dimensions.

As previously described, generating a desired arbitrary view comprises populating pixels of the desired arbitrary view with corresponding pixels harvested from perspective transformed or normalized existing reference views or images. For each reference image or view, intrinsic and extrinsic camera attributes are known. For each pixel of a reference image or view, relative location or position information is known. For example, for each pixel of a reference image or view, xyz spatial coordinates at each uv on the corresponding image array are known. A simple geometric mapping or transformation that employs any one or more appropriate mathematical techniques is used to transform the perspective of a reference image into the perspective of a desired arbitrary view. Some pixels of the perspective transformed reference image may map to pixels of the desired arbitrary view. These pixels of the perspective transformed reference image may be used to populate corresponding pixels of the image array comprising the desired arbitrary view. The pixels of the perspective transformed reference image that map outside the image array of the desired arbitrary view are discarded.

Figure 4:
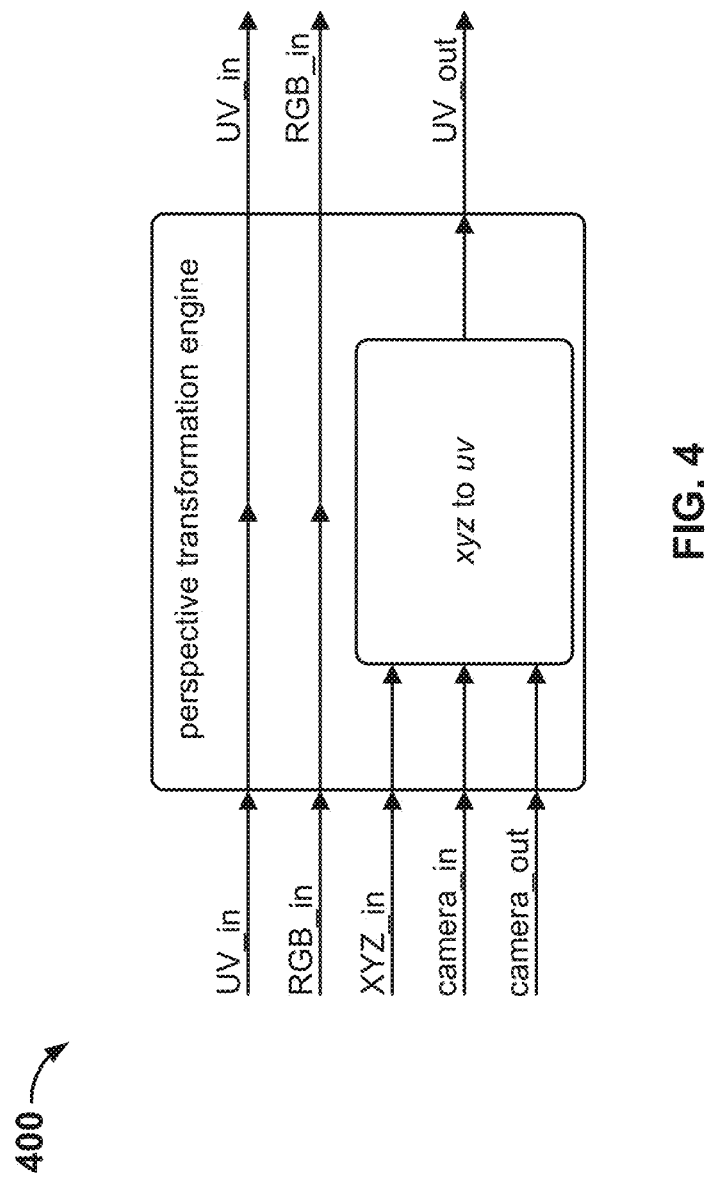
FIG. 4 is a high level block diagram illustrating an embodiment of inputs and outputs of a perspective transformation or normalization engine.

FIG. 4 is a high level block diagram illustrating an embodiment of inputs and outputs of a perspective transformation or normalization engine. For example, perspective transformation engine 400 may comprise perspective transformation engine 112 of arbitrary view generator 102 of system 100 of FIG. 1. As depicted, inputs to perspective transformation engine 400 include RGB pixel intensity values at $u_{in}$, $v_{in}$ coordinates on the image array of a prescribed reference view; x, y, z coordinates of the point in space that projects at each $u_{in}$, $v_{in}$ on the image array; and camera attributes of the reference view (camera_in) and the desired arbitrary view or perspective (camera_out). The input and output camera attributes may include, for instance, pose, focal length, intrinsic parameters, sensor dimensions, aspect ratio, etc. The output of perspective transformation engine 400 comprises the $u_{out}$, $v_{out}$ coordinates for each $u_{in}$, $v_{in}$ coordinates. In the given example, the x, y, z coordinates of the pixels as well as input and output camera attributes are employed to perform the transformation, and the RGB pixel intensity values and $u_{in}$, $v_{in}$ coordinates are passed through perspective transformation engine 400 as outputs.

Figure 5:
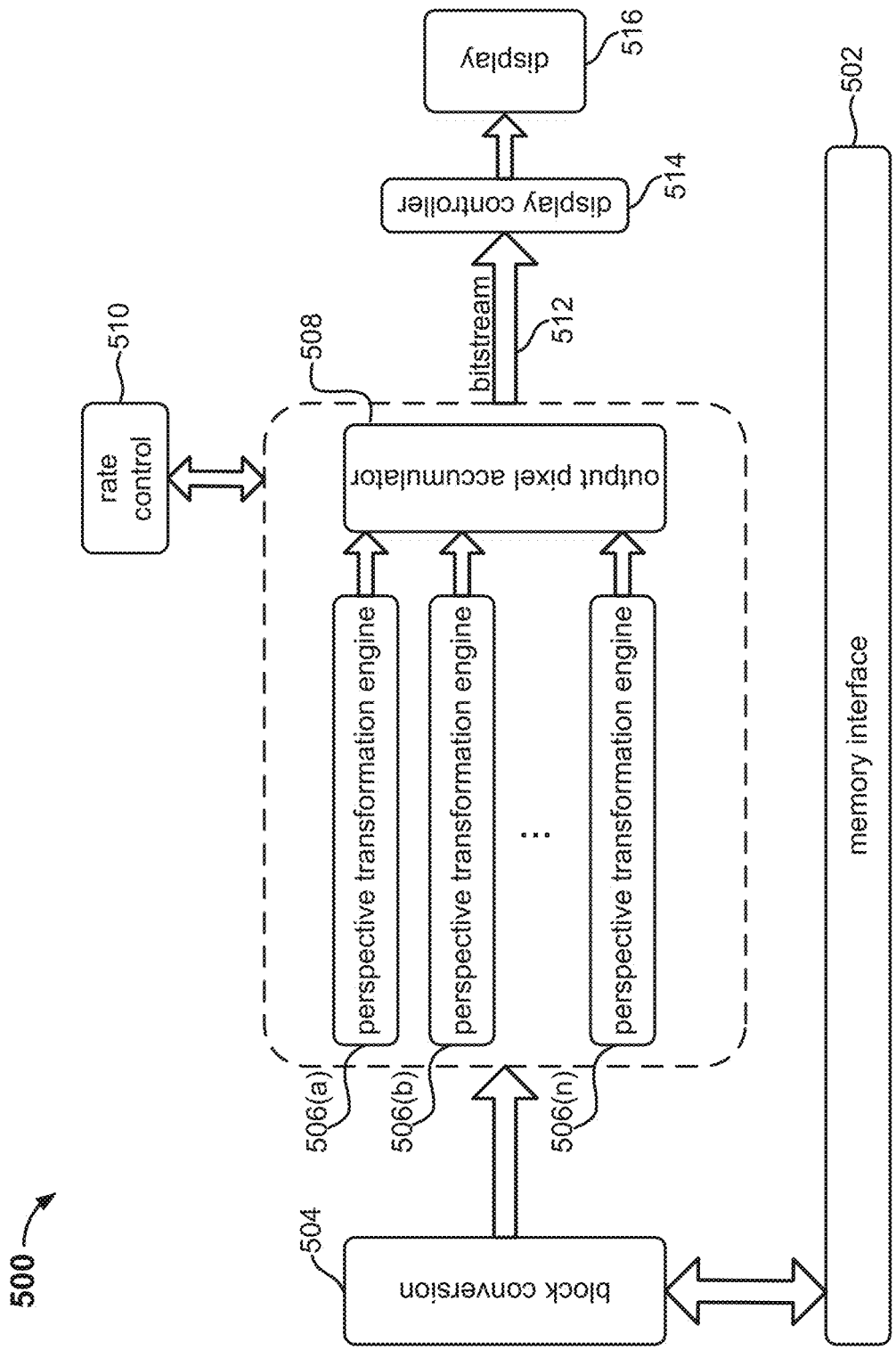
FIG. 5 is a high level block diagram illustrating an embodiment of a system for generating a desired arbitrary view or perspective of a scene.

FIG. 5 is a high level block diagram illustrating an embodiment of a system for generating a desired arbitrary view or perspective of a scene. For example, system 500 may comprise an embodiment of system 100 of FIG. 1. In various embodiments, one or more components of system 500 may be implemented as an FPGA (field-programmable gate array), an ASIC (application-specific integrated circuit), or some other fixed point implementation.

In some embodiments, processing steps associated with the components comprising system 500 are iterated for each of a plurality of sequentially requested desired arbitrary perspectives or views. In such cases, the speed of generating each output view defines a frame rate and quality of system 500. Frame rate and quality are inversely related, i.e., a relatively slower frame rate facilitates the generation of a higher quality output frame or image.

As one example, system 500 may be employed with respect to an interactive application that allows a (virtual) camera viewing a scene to be moved to arbitrary poses or perspectives and that displays those perspectives in real time as the camera moves. In such cases, the processing of system 500 is iterated with respect to each new frame or camera perspective or pose requested. In some such cases, motion of the (virtual) camera may at least in part be constrained to ensure that only arbitrary camera views that can be generated from existing reference views of the scene are requested.

As depicted, system 500 comprises memory interface 502 that interfaces with an associated memory (not shown). In some embodiments, asset management engine 110 of arbitrary view generator 102 of system 100 of FIG. 1 includes memory interface 502. All or a subset of existing reference images or views of a scene are loaded into memory (e.g., from storage such as database 106 of system 100 of FIG. 1) and streamed into system 500.

In some embodiments, existing reference images or views are intelligently streamed into system 500 in a prescribed order. Such an order may be based on strategies for more quickly generating a desired arbitrary view or perspective. Generally, any appropriate reference image order or selection strategy may be employed. One example of a strategy for reference image selection includes defining a distance measure or metric that quantifies closeness of camera poses and selecting a reference image or view that is closest in pose to the desired arbitrary perspective. Such a pose or perspective distance measure may further be employed to later select a next closest reference image or view and so forth until the desired arbitrary perspective is completely populated or all or a threshold number of reference views have been used. Another example for reference image selection comprises a coarse to fine strategy in which reference images or views that coarsely sample pose space of the desired arbitrary view are first selected and streamed into system 500 and in later stages reference images or views that more finely sample pose space are selected and streamed into system 500.

As illustrated in FIG. 5, system 500 furthermore comprises block conversion component 504. In some embodiments, asset management engine 110 of arbitrary view generator 102 of system 100 of FIG. 1 includes block conversion component 504. Each input reference image or view streamed into system 500 is divided into a plurality of blocks of prescribed sizes (e.g., 8×8 pixels, 16×16 pixels, etc.) by block conversion component 504, which may then be parallel processed by subsequent components of system 500.

Pixel block streams generated by block conversion component 504 are parallel processed by a plurality of perspective transformation engines 506 of system 500. Each perspective transformation engine 506 of system 500 of FIG. 5 may comprise perspective transformation engine 112 of arbitrary view generator 102 of system 100 of FIG. 1 and/or perspective transformation engine 400 of FIG. 4. As previously described, each perspective transformation engine 506 transforms the perspective of a reference image or view or portions thereof into a desired arbitrary view or perspective.

The outputs of perspective transformation engines 506 are employed by output pixel accumulator 508 of system 500 to populate corresponding pixels of an image array of the desired arbitrary view or perspective as applicable. Output pixel accumulator 508 may comprise, for example, merging engine 114 of arbitrary view generator 102 of system 100 of FIG. 1. Output pixel accumulator 508 may determine that an image array is complete based on one or more parameters and/or thresholds. Moreover, any pixels that have not been populated may be interpolated, e.g., by interpolation engine 116 of arbitrary view generator 102 of system 100 of FIG. 1, which may comprise a component of output pixel accumulator 508 of system 500.

System 500 moreover comprises rate control component 510 for controlling the quality and frame rate of the desired arbitrary views generated by system 500. A better quality may be achievable with a relatively slower frame rate while a very fast frame rate may be achievable at relatively lower quality. Generally, any appropriate strategy may be employed to make decisions about and control quality and frame rate, i.e., the rate of change of camera pose or perspective and generation of corresponding views or frames from reference views. For example, in applications in which camera pose is not changing at a high rate, a higher quality output image may be generated by considering all available or a threshold number of reference input images followed by filtering to remove noise. In some cases, filtering comprises spatial filtering in the output image or view generated. In some cases, filtering comprises filtering to combine pixel intensity values (e.g., RGB values) from multiple reference input images that map to the same pixel in the output image or view being generated. The redundant, non-unique mapping of multiple reference image pixels to the same output image pixel facilitates more anti-aliasing and better quality to be achieved in the output image. However, in applications requiring very high frame rates, a single reference image pixel (e.g., the first that is found) may be mapped to each output image pixel and any redundant input reference image pixels are discarded to more quickly generate the output image.

Once the image array of the desired arbitrary view or perspective is complete or filled, output pixel accumulator 508 outputs a bitstream 512 comprising the view to display controller 514, which renders the generated desired arbitrary view on display 516. Bitstream 512 may comprise, for example, output 108 of arbitrary view generator 102 of system 100 of FIG. 1.

The processing steps associated with the components comprising system 500 may be iterated for each frame (i.e., camera perspective) change. Specifically with respect to system 500, the processing associated with retrieving existing reference images or views from memory, dividing each reference image or view into blocks, transforming to the perspective of the desired view, and populating pixels of the desired view is performed with respect to each new camera perspective requested. More generally, process 300 of FIG. 3 or a variant thereof is repeated or iterated for each new camera perspective or frame requested.

System 500 or one or more components thereof may comprise a dedicated embedded hardware implementation (such as an FPGA or ASIC) for quickly generating high quality arbitrary views. Such a platform is especially useful in systems and applications that require the dynamic (e.g., on-demand or real-time) generation of high definition arbitrary views, such as gaming systems and applications, virtual or alternative reality systems and applications, CGI (computer-generated imagery) systems and applications, etc. For example, the described architecture may be employed to generate frames that capture motion of objects comprising a scene and/or of a (virtual) camera viewing the scene. Moreover, the described architecture may be advantageously employed to quickly output large numbers of video frames, e.g., when making motion pictures or animations.

The previously disclosed techniques furthermore describe the generation of an arbitrary ensemble view comprising a plurality of independent scenes by using existing reference images or views of each of the plurality of scenes. Perspective transformation and/or normalization allow pixels comprising independently captured or rendered images or views of the plurality of scenes to be consistently combined into a desired arbitrary ensemble or composite view.

As described, a coordinate system origin may be defined at the center (e.g., center of mass) of a scene. That is, a prescribed scene is positioned or located at the origin in its own world space. However, when multiple scenes are combined, each of the scenes needs to be appropriately placed or positioned in the ensemble or composite scene space.

Figure 6:
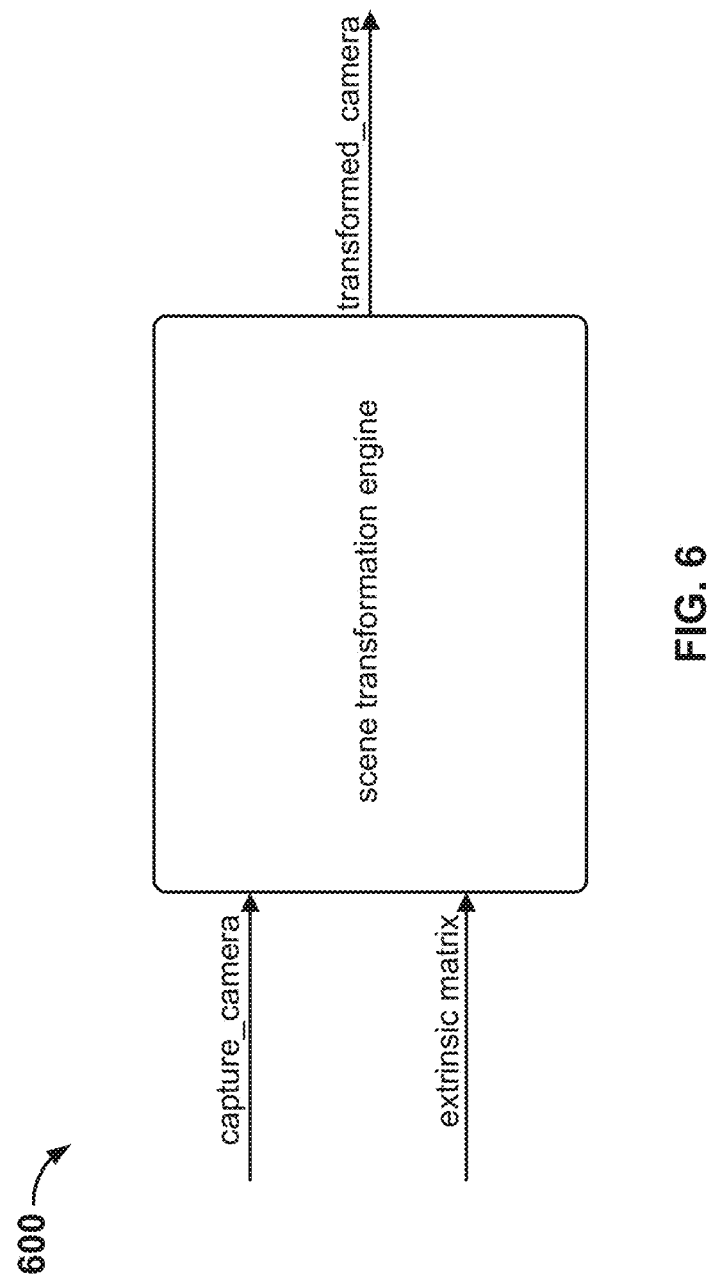
FIG. 6 is a high level block diagram illustrating an embodiment of inputs and outputs of a scene transformation engine.

FIG. 6 is a high level block diagram illustrating an embodiment of inputs and outputs of a scene transformation engine 600 that transforms scene coordinates such that a scene centered at its own origin is translated and appropriately positioned in a composite scene space. Scene transformation engine 600 effectively determines the change in camera attributes (e.g., pose) when a scene is included in a composite scene comprising a plurality of independent scenes. In some embodiments, scene transformation engine 600 is a part of asset management engine 110 of arbitrary view generator 102 of system 100 of FIG. 1. As depicted, inputs to scene transformation engine 600 comprise capture camera attributes of a (virtual) camera that imaged or rendered a scene as well as the translation and/or rotation (i.e., extrinsic matrix) of the scene in the composite scene space. The output of scene transformation engine 600 comprises transformed camera attributes that place the given scene in an appropriate position or location in the composite scene space. The capture and transformed camera attributes may include, for instance, pose, focal length, intrinsic parameters, sensor dimensions, aspect ratio, etc. In some embodiments, each reference image or view of each of a plurality of scenes comprising a composite scene is transformed to the composite scene space using scene transformation engine 600.

Figure 7:
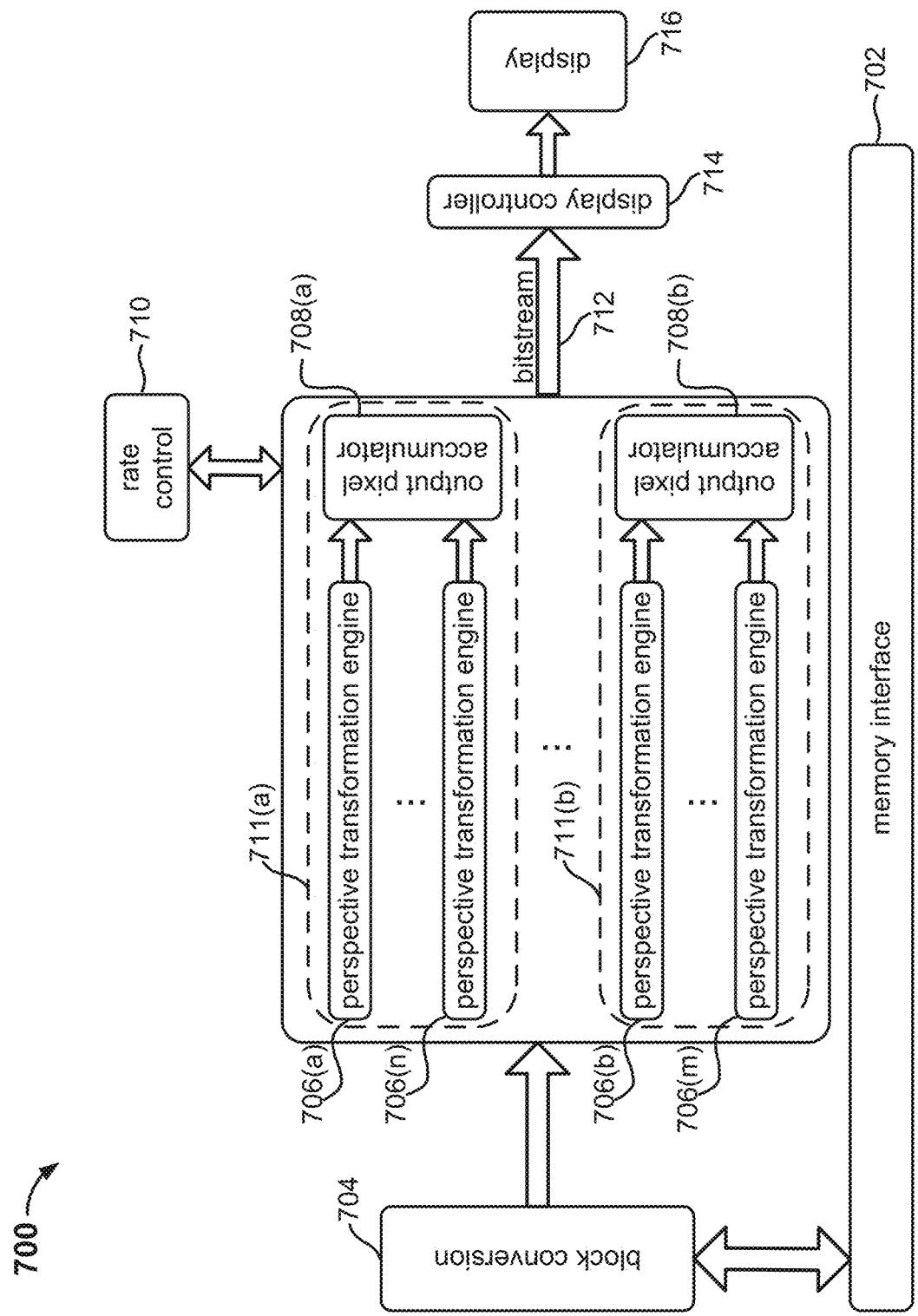
FIG. 7 is a high level block diagram illustrating an embodiment of a system for generating a desired arbitrary view or perspective of an ensemble or composite scene.

FIG. 7 is a high level block diagram illustrating an embodiment of a system for generating a desired arbitrary view or perspective of an ensemble or composite scene comprising a plurality of independent scenes. For example, system 700 may comprise an embodiment of system 100 of FIG. 1. System 700 is similar to system 500. However, system 700 comprises an embodiment of an arbitrary view generation system for an ensemble or composite scene while system 500 comprises an embodiment of an arbitrary view generation system for a single scene. Various components 702-716 of system 700 are similar to corresponding components 502-516 of system 500. Thus, the description provided with respect to the components comprising system of 500 of FIG. 5 similarly applies to corresponding components of system 700 of FIG. 7.

Specifically, in the embodiment of system 700, a plurality of reference images or views that have been transformed into a composite scene space for each of a plurality of independent scenes is loaded into memory and streamed into system 700 via memory interface 702 possibly in a prescribed order based on a reference image selection strategy; each reference image is divided into blocks by block conversion component 704; and for each of the plurality of independent scenes, associated pixel block streams are parallel processed by a plurality of perspective transformation engines 706 whose outputs are used by output pixel accumulator 708 to populate an image array of a desired arbitrary view or perspective of the given scene that has a quality and frame rate defined or specified by rate control component 710. As depicted, system 700 includes parallel components 711 comprising perspective transformation engines 706 and output pixel accumulator 708 for each scene comprising a composite scene. Once the image array of each of the plurality of scenes is complete or filled, the outputs of output pixel accumulators 708 are combined to generate a bitstream 712 comprising a requested view of the composite scene which is provided to display controller 714, which renders the generated desired arbitrary view of the composite scene on display 716.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   translating images associated with a plurality of independent scenes to a prescribed origin;
   transforming translated images associated with each independent scene into a prescribed perspective;
   populating pixels of an image array having the prescribed perspective that is associated with each independent scene with corresponding pixels from the transformed translated images associated with that independent scene; and
   generating an ensemble image comprising the prescribed perspective at least in part by combining at least some pixels of image arrays associated with the plurality of independent scenes.

2. The method of claim 1, wherein translated images associated with each independent scene are transformed into the prescribed perspective in a prescribed order.

3. The method of claim 1, wherein the plurality of independent scenes is at least in part parallel processed to generate corresponding image arrays.

4. The method of claim 1, wherein transforming translated images associated with each independent scene into the prescribed perspective comprises, for each translated image, dividing image pixels into a plurality of pixel blocks and transforming the pixel blocks into the prescribed perspective.

5. The method of claim 4, wherein the pixel blocks are transformed into the prescribed perspective by parallel processing at least a subset of the pixel blocks.

6. The method of claim 4, wherein at least some transformed pixel blocks comprise at least some missing pixels resulting from transformation to the prescribed perspective from other perspectives.

7. The method of claim 1, wherein a pixel of the image array having the prescribed perspective that is associated with each independent scene is populated with a first found corresponding pixel from transformed translated images associated with that independent scene.

8. The method of claim 1, wherein a pixel of the image array having the prescribed perspective that is associated with each independent scene is populated with a plurality of corresponding pixels from transformed translated images associated with that independent scene.

9. The method of claim 1, wherein pixels from multiple transformed translated images associated with each independent scene map to a same pixel in the image array having the prescribed perspective that is associated with that independent scene.

10. The method of claim 1, wherein generating the ensemble image comprising the prescribed perspective comprises combining multiple pixels that map to a same pixel in one or more image arrays of the plurality of independent scenes.

11. The method of claim 1, wherein generating the ensemble image comprising the prescribed perspective comprises interpolating one or more pixels that are unpopulated in one or more image arrays of the plurality of independent scenes.

12. The method of claim 1, wherein generating the ensemble image comprising the prescribed perspective comprises controlling a quality of the ensemble image.

13. The method of claim 1, wherein generating the ensemble image comprising the prescribed perspective comprises filtering.

14. The method of claim 1, wherein the ensemble image comprising the prescribed perspective is generated on-demand in real-time.

15. The method of claim 1, further comprising sequentially generating a plurality of ensemble images comprising one or more of the plurality of independent scenes, including the generated ensemble image, at a prescribed frame rate.

16. The method of claim 1, wherein images associated with the plurality of independent scenes comprise different perspectives than the prescribed perspective.

17. The method of claim 1, wherein images associated with the plurality of independent scenes comprise metadata.

18. The method of claim 1, wherein each of the plurality of independent scenes comprises one or more objects.

19. A system, comprising:
   a processor configured to:
     translate images associated with a plurality of independent scenes to a prescribed origin;
     transform translated images associated with each independent scene into a prescribed perspective;
     populate pixels of an image array having the prescribed perspective that is associated with each independent scene with corresponding pixels from the transformed translated images associated with that independent scene; and
     generate an ensemble image comprising the prescribed perspective at least in part by combining at least some pixels of image arrays associated with the plurality of independent scenes; and
   a memory coupled to the processor and configured to provide the processor with instructions.

20. The system of claim 19, wherein translated images associated with each independent scene are transformed into the prescribed perspective in a prescribed order.

21. The system of claim 19, wherein the plurality of independent scenes is at least in part parallel processed to generate corresponding image arrays.

22. The system of claim 19, wherein to transform translated images associated with each independent scene into the prescribed perspective comprises, for each translated image, to divide image pixels into a plurality of pixel blocks and to transform the pixel blocks into the prescribed perspective.

23. The system of claim 22, wherein the pixel blocks are transformed into the prescribed perspective by parallel processing at least a subset of the pixel blocks.

24. The system of claim 22, wherein at least some transformed pixel blocks comprise at least some missing pixels resulting from transformation to the prescribed perspective from other perspectives.

25. The system of claim 19, wherein a pixel of the image array having the prescribed perspective that is associated with each independent scene is populated with a first found corresponding pixel from transformed translated images associated with that independent scene.

26. The system of claim 19, wherein a pixel of the image array having the prescribed perspective that is associated with each independent scene is populated with a plurality of corresponding pixels from transformed translated images associated with that independent scene.

27. The system of claim 19, wherein pixels from multiple transformed translated images associated with each independent scene map to a same pixel in the image array having the prescribed perspective that is associated with that independent scene.

28. The system of claim 19, wherein to generate the ensemble image comprising the prescribed perspective comprises to combine multiple pixels that map to a same pixel in one or more image arrays of the plurality of independent scenes.

29. The system of claim 19, wherein to generate the ensemble image comprising the prescribed perspective comprises to interpolate one or more pixels that are unpopulated in one or more image arrays of the plurality of independent scenes.

30. The system of claim 19, wherein to generate the ensemble image comprising the prescribed perspective comprises to control a quality of the ensemble image.

31. The system of claim 19, wherein to generate the ensemble image comprising the prescribed perspective comprises to filter.

32. The system of claim 19, wherein the ensemble image comprising the prescribed perspective is generated on-demand in real-time.

33. The system of claim 19, wherein the processor is further configured to sequentially generate a plurality of ensemble images comprising one or more of the plurality of independent scenes, including the generated ensemble image, at a prescribed frame rate.

34. The system of claim 19, wherein images associated with the plurality of independent scenes comprise different perspectives than the prescribed perspective.

35. The system of claim 19, wherein images associated with the plurality of independent scenes comprise metadata.

36. The system of claim 19, wherein each of the plurality of independent scenes comprises one or more objects.

37. A computer program product, the computer program product being embodied in a non-transitory computer readable storage medium and comprising computer instructions which when executed cause a computer to:
- translate images associated with a plurality of independent scenes to a prescribed origin;
- transform translated images associated with each independent scene into a prescribed perspective;
- populate pixels of an image array having the prescribed perspective that is associated with each independent scene with corresponding pixels from the transformed translated images associated with that independent scene; and
- generate an ensemble image comprising the prescribed perspective at least in part by combining at least some pixels of image arrays associated with the plurality of independent scenes.

38. The computer program product of claim 37, wherein translated images associated with each independent scene are transformed into the prescribed perspective in a prescribed order.

39. The computer program product of claim 37, wherein the plurality of independent scenes is at least in part parallel processed to generate corresponding image arrays.

40. The computer program product of claim 37, wherein to transform translated images associated with each independent scene into the prescribed perspective comprises, for each translated image, to divide image pixels into a plurality of pixel blocks and to transform the pixel blocks into the prescribed perspective.

41. The computer program product of claim 40, wherein the pixel blocks are transformed into the prescribed perspective by parallel processing at least a subset of the pixel blocks.

42. The computer program product of claim 40, wherein at least some transformed pixel blocks comprise at least some missing pixels resulting from transformation to the prescribed perspective from other perspectives.

43. The computer program product of claim 37, wherein a pixel of the image array having the prescribed perspective that is associated with each independent scene is populated with a first found corresponding pixel from transformed translated images associated with that independent scene.

44. The computer program product of claim 37, wherein a pixel of the image array having the prescribed perspective that is associated with each independent scene is populated with a plurality of corresponding pixels from transformed translated images associated with that independent scene.

45. The computer program product of claim 37, wherein pixels from multiple transformed translated images associated with each independent scene map to a same pixel in the image array having the prescribed perspective that is associated with that independent scene.

46. The computer program product of claim 37, wherein to generate the ensemble image comprising the prescribed perspective comprises to combine multiple pixels that map to a same pixel in one or more image arrays of the plurality of independent scenes.

47. The computer program product of claim 37, wherein to generate the ensemble image comprising the prescribed perspective comprises to interpolate one or more pixels that are unpopulated in one or more image arrays of the plurality of independent scenes.

48. The computer program product of claim 37, wherein to generate the ensemble image comprising the prescribed perspective comprises to control a quality of the ensemble image.

49. The computer program product of claim 37, wherein to generate the ensemble image comprising the prescribed perspective comprises to filter.

50. The computer program product of claim 37, wherein the ensemble image comprising the prescribed perspective is generated on-demand in real-time.

51. The computer program product of claim 37, further comprising computer instructions which when executed cause a computer to sequentially generate a plurality of ensemble images comprising one or more of the plurality of independent scenes, including the generated ensemble image, at a prescribed frame rate.

52. The computer program product of claim 37, wherein images associated with the plurality of independent scenes comprise different perspectives than the prescribed perspective.

53. The computer program product of claim 37, wherein images associated with the plurality of independent scenes comprise metadata.

54. The computer program product of claim 37, wherein each of the plurality of independent scenes comprises one or more objects.

* * * * *